(12) United States Patent
Shorb

(10) Patent No.: US 8,572,617 B2
(45) Date of Patent: Oct. 29, 2013

(54) PROCESSOR-IMPLEMENTED SYSTEMS AND METHODS FOR EVENT HANDLING

(75) Inventor: Charles Scott Shorb, Cary, NC (US)

(73) Assignee: SAS Institute Inc., Cary, NC (US)

( * ) Notice: Subject to any disclaimer, the term of this patent is extended or adjusted under 35 U.S.C. 154(b) by 609 days.

(21) Appl. No.: 12/506,718

(22) Filed: Jul. 21, 2009

(65) Prior Publication Data

US 2011/0023032 A1 Jan. 27, 2011

(51) Int. Cl.
*G06F 9/46* (2006.01)
*G06F 9/44* (2006.01)

(52) U.S. Cl.
USPC ............ 718/102; 718/104; 718/106; 719/318

(58) Field of Classification Search
None
See application file for complete search history.

(56) References Cited

U.S. PATENT DOCUMENTS

| | | | |
|---|---|---|---|
| 4,604,694 A | 8/1986 | Hough | |
| 5,692,193 A | 11/1997 | Jagannathan et al. | |
| 5,860,159 A | 1/1999 | Hagersten | |
| 5,887,167 A * | 3/1999 | Sutton ......................... | 719/314 |
| 5,933,825 A | 8/1999 | McClaughry et al. | |
| 5,961,584 A * | 10/1999 | Wolf ........................... | 718/103 |
| 6,012,081 A * | 1/2000 | Dorn et al. ................... | 718/102 |
| 6,016,490 A | 1/2000 | Watanabe et al. | |
| 6,029,190 A | 2/2000 | Oliver | |
| 6,031,973 A * | 2/2000 | Gomi et al. ................... | 700/245 |
| 6,112,222 A | 8/2000 | Govindaraju et al. | |
| 6,247,025 B1 | 6/2001 | Bacon | |
| 6,343,339 B1 | 1/2002 | Daynes | |
| 6,480,918 B1 | 11/2002 | McKenney et al. | |
| 6,546,443 B1 | 4/2003 | Kakivaya et al. | |
| 6,598,068 B1 | 7/2003 | Clark | |
| 6,691,194 B1 | 2/2004 | Ofer | |
| 6,718,448 B1 | 4/2004 | Ofe | |
| 6,779,182 B1 | 8/2004 | Zolnowsky | |
| 6,836,887 B1 | 12/2004 | Such | |
| 6,883,026 B1 | 4/2005 | Onodera et al. | |
| 7,080,375 B2 | 7/2006 | Martin | |
| 7,117,496 B1 * | 10/2006 | Ramesh et al. ............... | 718/102 |
| 7,155,588 B1 | 12/2006 | Jeter, Jr. | |
| 7,376,744 B2 | 5/2008 | Loaiza et al. | |
| 7,380,073 B2 | 5/2008 | Shorb | |
| 7,444,634 B2 | 10/2008 | Jeyaram | |
| 7,594,091 B2 | 9/2009 | Shorb | |
| 7,640,535 B2 * | 12/2009 | Somogyi et al. .............. | 717/119 |
| 2002/0078119 A1 | 6/2002 | Brenner et al. | |
| 2003/0014558 A1 * | 1/2003 | Amamiya et al. ............ | 709/318 |

(Continued)

OTHER PUBLICATIONS

Robert van Renesse; The Horus system; Reliable Distributed Computing with the Isis Toolkit; Jul. 28, 1993; 20 pages.*

(Continued)

*Primary Examiner* — Abdullah Al Kawsar
(74) *Attorney, Agent, or Firm* — Kilpatrick Townsend & Stockton LLP

(57) ABSTRACT

Processor-implemented systems and methods are provided for synchronization of a thread, wherein the thread waits for one or more events to occur before continuing execution. A processor-implemented system and method can include a wait data structure which stores event conditions in order to determine when the thread should continue execution. Event objects, executing on one or more data processors, allow for thread synchronization. A pointer is stored with respect to a wait data structure in order to provide visibility of event conditions to the event objects. The thread continues execution when the stored event conditions are satisfied.

18 Claims, 12 Drawing Sheets

(56) References Cited

U.S. PATENT DOCUMENTS

| | | | |
|---|---|---|---|
| 2003/0126187 A1 | 7/2003 | Won et al. | |
| 2003/0200398 A1 | 10/2003 | Harris | |
| 2003/0233393 A1 | 12/2003 | Li | |
| 2004/0019875 A1* | 1/2004 | Welch | 717/109 |
| 2004/0059733 A1 | 3/2004 | Li | |
| 2004/0088573 A1 | 5/2004 | Jeyaram | |
| 2004/0117531 A1 | 6/2004 | McKenney | |
| 2004/0187122 A1* | 9/2004 | Gosalia et al. | 718/100 |
| 2006/0130062 A1 | 6/2006 | Burdick et al. | |
| 2006/0230411 A1 | 10/2006 | Richter et al. | |
| 2006/0236322 A1* | 10/2006 | Brackman | 718/103 |
| 2007/0061810 A1 | 3/2007 | Mehaffy et al. | |
| 2007/0113233 A1 | 5/2007 | Collard et al. | |
| 2007/0234326 A1 | 10/2007 | Kejariwal et al. | |
| 2007/0271450 A1 | 11/2007 | Doshi et al. | |
| 2008/0109807 A1 | 5/2008 | Rosenbluth | |
| 2008/0168458 A1 | 7/2008 | Fachan et al. | |
| 2008/0301714 A1* | 12/2008 | Martinsen | 719/318 |
| 2009/0013323 A1* | 1/2009 | May et al. | 718/104 |
| 2009/0271789 A1 | 10/2009 | Babich | |
| 2010/0250809 A1* | 9/2010 | Ramesh et al. | 710/200 |

OTHER PUBLICATIONS

Butenhof, David R., "Programming with POSIX Threads", Addison-Wesley Professional Computing Series, Chapter 7, pp. 241-269 [Oct. 1997].

Deitel, Harvey M., "An Introduction to Operating Systems", Chapter 5, pp. 112-151 [Feb. 1990].

Glasser, Daniel, "Efficient Synchronization Techniques for Multithreaded Win32®-based Applications", Microsoft Systems Journal, vol. 10, No. 2, pp. 61-81 [Feb. 1995].

Schimmel, Curt, "UNIX® Systems for Modern Architectures:Symmetric Multiprocessing and Caching for Kernel Programmers", Addison-Wesley Publishing Company, pp. 154-169, Jun. 15, 1994.

Stallings, William Ph.D., "Operating Systems: Internals and Design Principles", $4^{th}$ Edition, Prentice Hall, pp. 212-216, 2001.

Shorb, Charles S., U.S. Appl. No. 12/126,177, filed May 23, 2008 entitled "Computer-Implemented Method and System for Lock Handling".

Shorb, Charles S., U.S. Appl. No. 12/406,371, filed Mar. 18, 2009 entitled "Computer-Implemented Systems for Resource Level Locking Without Resource Level Locks".

\* cited by examiner

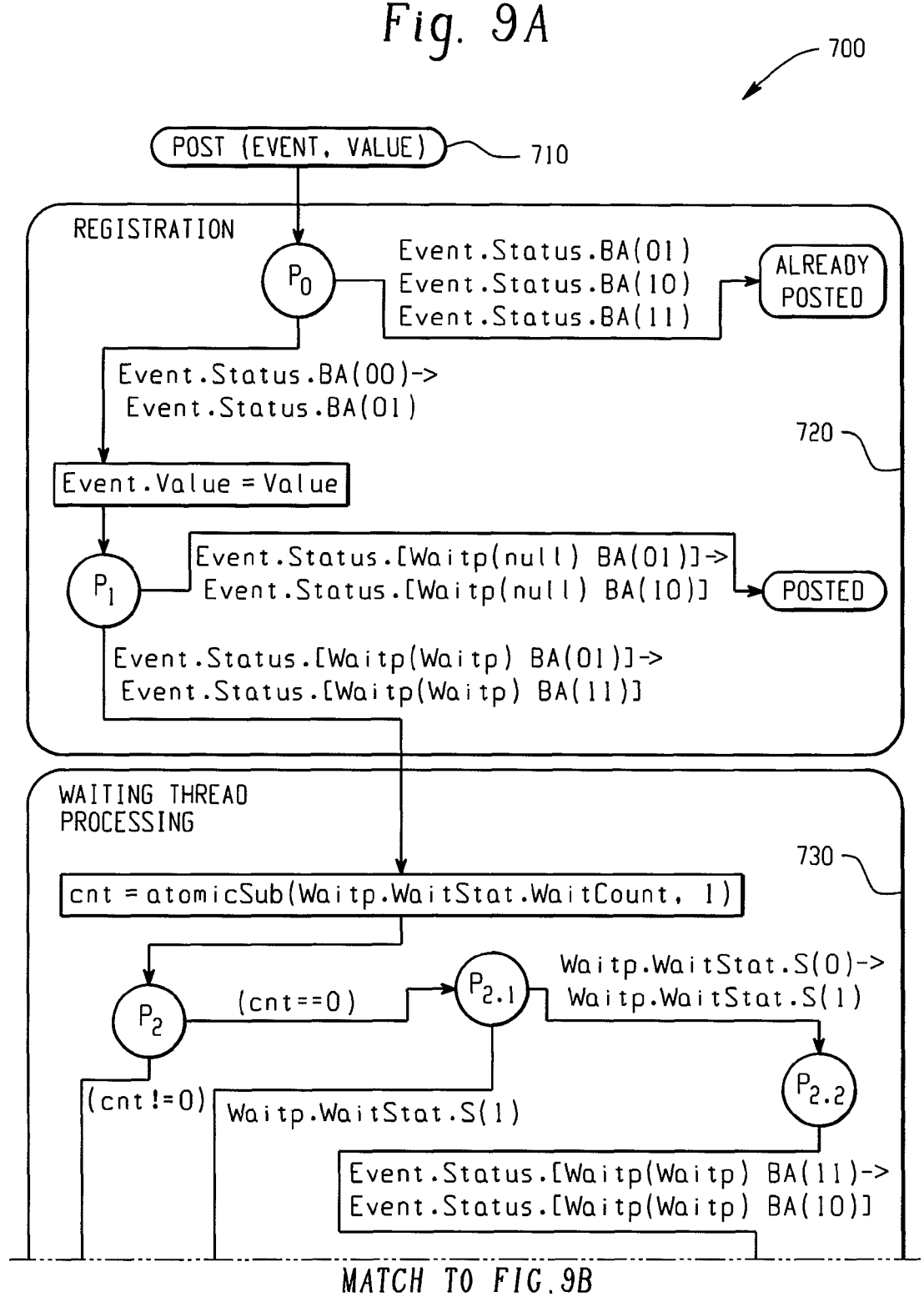

MATCH TO FIG.10B

PROCESSOR-IMPLEMENTED SYSTEMS AND METHODS FOR EVENT HANDLING

TECHNICAL FIELD

This document relates generally to processor-implemented systems and methods for multi-threaded environments and more particularly to processor-implemented systems and methods for event handling within a multi-threaded environment.

BACKGROUND

Many operating systems support multiple concurrent threads of execution. In certain situations, threads must wait on particular events to occur before continuing their execution. However, operating systems generally limit the number of events that can be waited upon by the threads. Still further, the number of events posted to trigger a wait complete is limited to one or all events posted.

For example, operating systems provide native event abstractions, such as the CreateEvent( ) routine in Windows and condition variables in Unix. Each of these has a limitation both in the number of events that can be simultaneously waited on as well as a limitation that the events are waited on in an all or nothing fashion.

SUMMARY

In accordance with the teachings provided herein, systems and methods for operation upon data processing devices are provided for synchronization of a thread, wherein the thread waits for one or more events to occur before continuing execution. As an example, a processor-implemented system and method can include a wait data structure, stored on computer-readable medium, which stores event conditions in order to determine when the thread should continue execution. Event objects, executing on one or more data processors, allow for thread synchronization. A pointer is stored with respect to a wait data structure in order to provide visibility of event conditions to the set of event objects. The thread continues execution when the stored event conditions are satisfied.

As another example, a processor-implemented system and method can be configured for synchronization of a thread, wherein the thread waits for one or more events to occur before continuing execution. A wait data structure, stored on computer-readable medium, stores event conditions which determine when the thread continues execution. Event objects, executing on one or more data processors, allow for thread synchronization. A registration process provides a notification mechanism for a set of event objects that are associated with the one or more events upon which the thread waits to occur before continuing execution. The notification includes the set of event objects being provided with visibility of the event conditions stored in the wait data structure. A pointer is stored with respect to a wait data structure in order to provide visibility of the event conditions to the set of event objects. The thread continues execution when the stored event conditions are satisfied.

DETAILED DESCRIPTION

Figure 1:
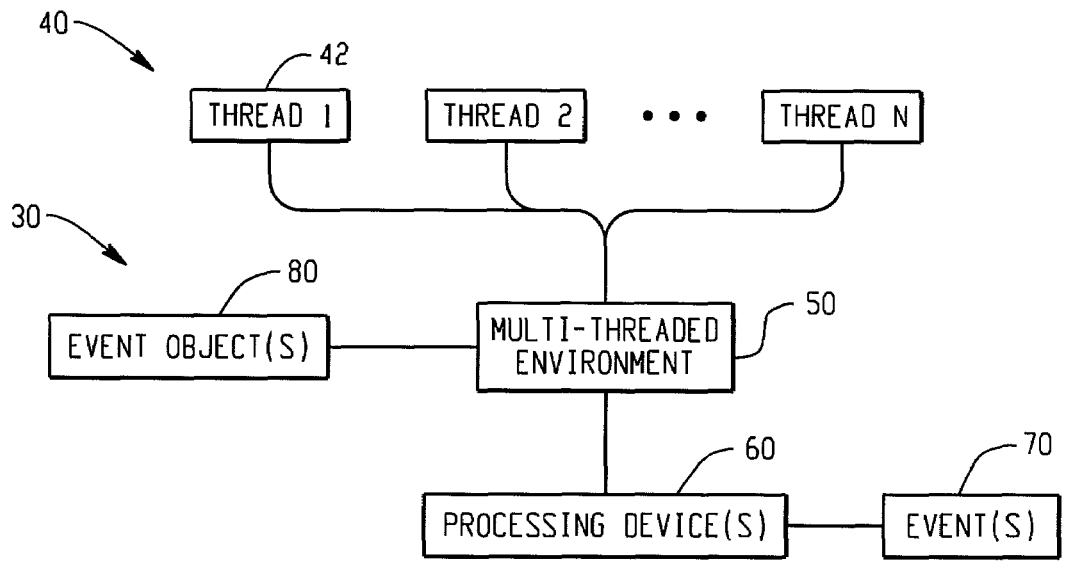
FIG. 1 is a block diagram depicting a processor-implemented system for handling one or more threads executing within a multi-threaded environment.

FIG. 1 depicts at 30 a processor-implemented system that handles one or more threads 40 executing within a multi-threaded environment 50. One or more processing device(s) 60 provide the multi-threaded environment 50 for the threads 40. The processing device(s) 60 can include many different types of computing platforms, such as a single multi-threaded object server or a networked set of multi-threaded object servers. The processing device(s) 60 support multiple, concurrent requests for various computer-based resources.

During a thread's execution, a thread (e.g., thread 42) may have to wait on multiple asynchronous events 70 before it can continue its processing. A thread may have to wait for a variety of reasons (i.e., wait conditions). For example, a thread may be waiting on a series of buffers to be full before processing (e.g., waiting on slower I/O). When a percentage of the buffers have been filled, the computation can begin processing while the I/O continues to use the buffers that are yet to be filled. In this example, the event handling system 30 can be configured to allow for any number of events 70 (e.g., buffer-related events) to have to be posted in order to satisfy the wait condition. To handle synchronization of threads 40 with respect to such events 70, the event handling system 30 includes event objects 80.

Figure 2:
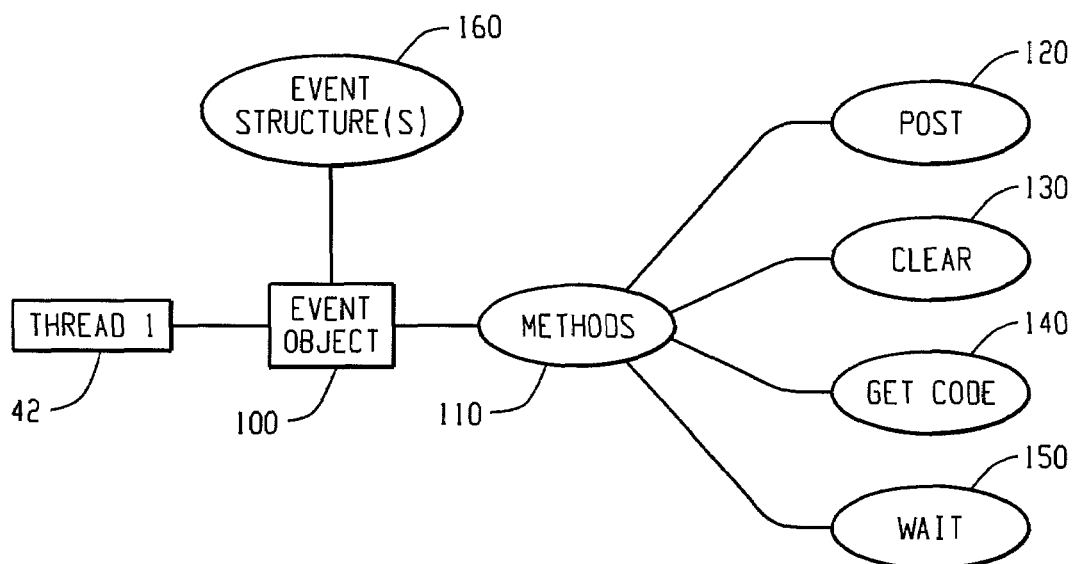
FIGS. 2 and 3 are block diagrams depicting examples of an event object for performing thread and event synchronization.

FIG. 2 depicts at 100 an example of an event object for performing thread and event synchronization. In this example, the event object 100 is an operating system level object which allows for synchronization of threads by using such methods 110 as: Post( ) 120, Clear( ) 130, GetCode( ) 140, and Wait( ) 150. The event object 100 also can be configured to maintain internal pieces of information in event structure(s) 160, such as state information (e.g., posted or cleared) and, when in the posted state, status or Post Code information.

More specifically with respect to the methods 110 of the event object 100, the Post method 120 of the event object 100 can be configured to check the status of the event (which information is stored in the structure(s) 160 of the event object 100). If it is not already posted, the Post method 120 sets the internal state to a POSTED value and updates the event's Post Code to that provided in the Post( ) method 120. Any thread attempting to wait (or is currently waiting) on this event (which is associated with the event object 100) will have the condition met for this single event.

The Clear method 130 of the event object 100 operates to clear the status of the event. The Clear method's processing is the reverse of the Post operation. With respect to the GetCode method 140, if the status of the event is posted, the Post Code can be obtained using the GetCode method 140. This ensures that the event is in the posted state and that the code associated with the Post( ) call is returned.

Figure 3:
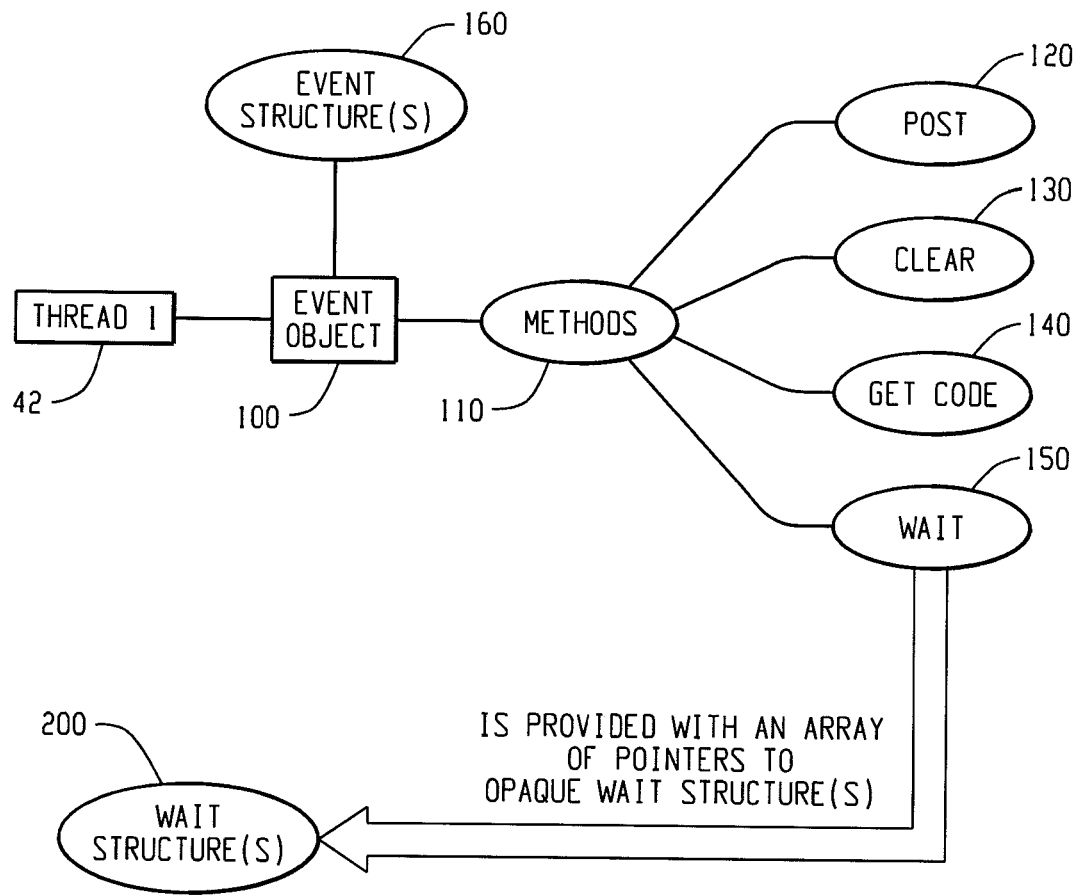

Threads use the Wait method 150 of the event object 100 to ensure that one or more wait conditions have been met before continued processing. An event handling system 30 can allow for waiting on any number of events instead of one or all events. This is effected by management of the visibility of each component in the event/wait pairing, such as by providing the Wait method 150 with an array of pointers to wait structure(s) 200 (e.g., opaque wait structure(s)) as shown in FIG. 3.

Figure 4:
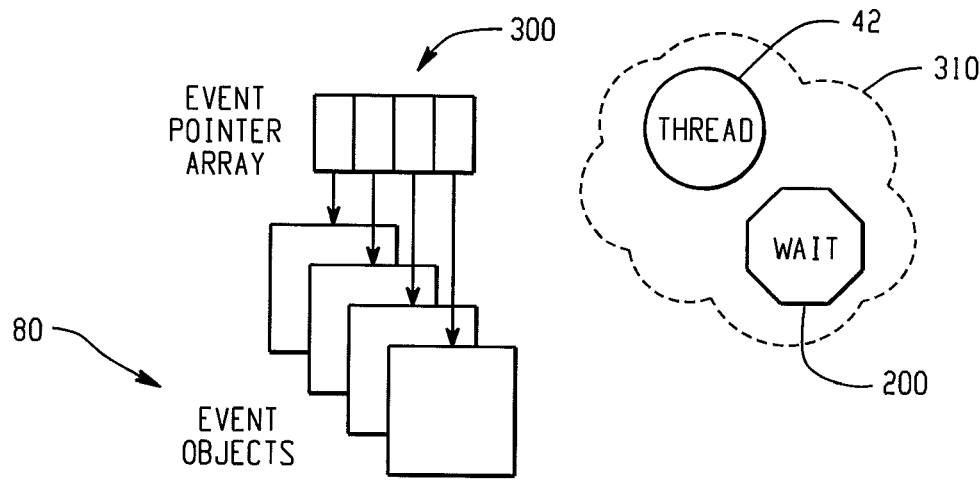
FIGS. 4-6 depict an example of an operational scenario, which involves wait processing, registration, and post-processing.
Figure 5:
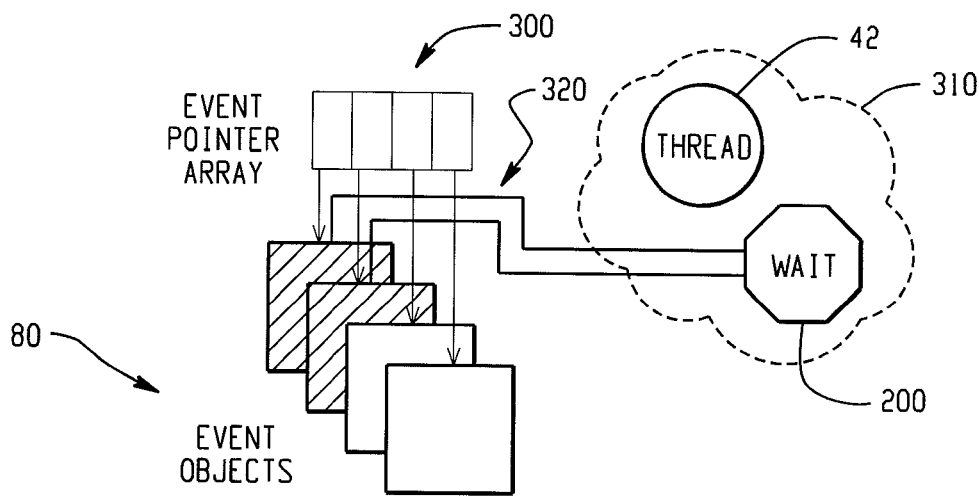
Figure 6:
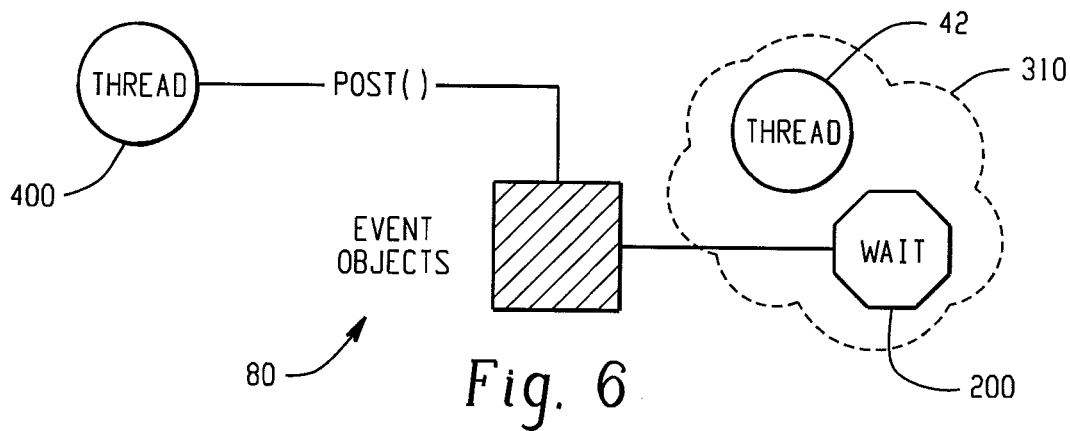

As an example of utilization of the wait structure(s) 200, FIGS. 4-6 provide an operational scenario, which involves wait processing, registration, and post-processing. FIG. 4 depicts a wait processing scenario wherein an array of event pointers 300 are used by the Wait method with event objects 80 in order to handle events. In the array 300, a first pointer is associated with a first event object, a second pointer is associated with a second event, and so on. A wait structure(s) 200 is associated with a thread 42 which is waiting on multiple events.

FIG. 5 depicts the registration phase of this operational scenario. In the registration phase, the wait operation steps through each of the events and atomically stores a pointer back to the wait structure 200 as shown at 320. At the same time that the pointer is stored, the status of the event is obtained. If the number of posted events is greater than the number of events to be waited upon, then the process can be short circuited and de-registration processing can begin.

If all of the events register the wait structure pointer, then the waiting thread 42 enters into the OS wait processing. Threads posting registered event object(s) 80 update a counter in the wait structure 200. This counter tracks the number of events that need to be posted before the "woEvent" (i.e., the Event API provided by a commercially available operating system) for the waiting thread 42 can be posted. (The prefix "wo" has been generally added herein to more clearly indicate that an operating system routine is involved (instead of the WAIT and POST routines that are part of the innovative aspects disclosed herein).) If the count goes to zero, then negotiations are made to determine who should post the woEvent. Only one of the waiting thread 42 or an active thread posting the event object 80 will succeed marking the wait structure 200 for the responsibility of posting the woEvent. If the waiting thread 42 has this responsibility, no wait on the woEvent is necessary. Otherwise, the waiting thread 42 will be required to perform a wait on the woEvent; and the thread posting the registered event object 80 will post woEvent.

Once signaled, the waiting thread 42 then de-registers each event which was registered with a wait structure pointer. It may be the case that a post or clear operation is occurring during this de-registration processing. The event status bits are used to detect this. A separate de-registration count is used to ensure that post and clear events having visibility of the wait structure are accounted for in this operational scenario.

FIG. 6 depicts the post-processing phase of this operational scenario. In this phase, post-processing attempts to change the status of the event to a posted state. At the same time the event state is updated to reflect a Posted Status, and any registered wait structure pointers are also obtained. If there is a valid wait structure pointer, then the counter in the wait structure 200 is updated. If this counter is zero and the wait signal bit can be obtained, then the posting thread 400 has the responsibility of posting the woEvent. It can also be the case that the post operation to update the wait counter occurs at the same time as a wait de-registration operation. The post operation will be notified of this by the wait structure pointer in its status field being zeroed out on return from updating the wait structure counter. At this point the post operation will use the wait structure de-registration counter as described above.

Figure 7:
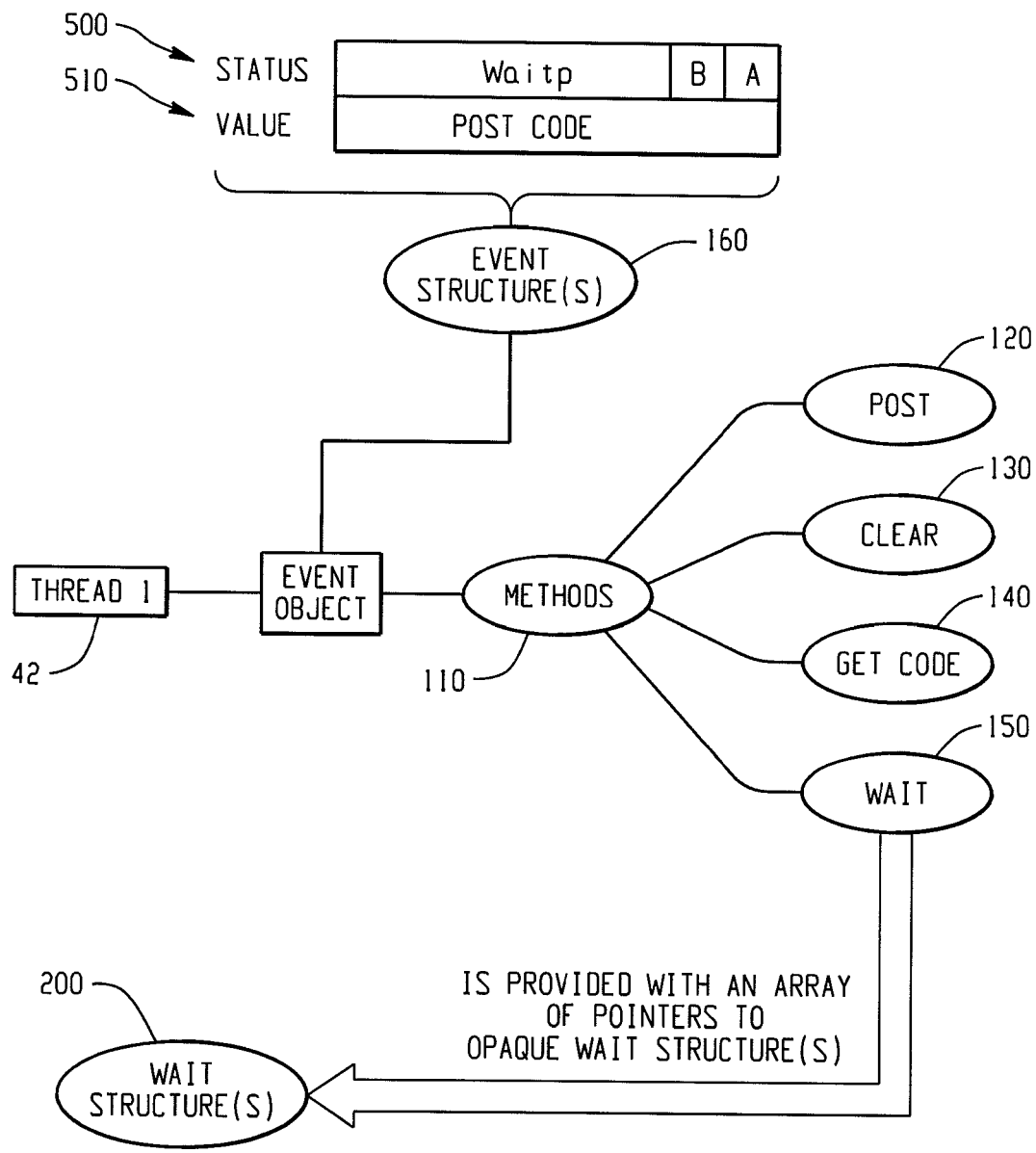
FIGS. 7 and 8 depict an example of event and wait structures.
Figure 8:
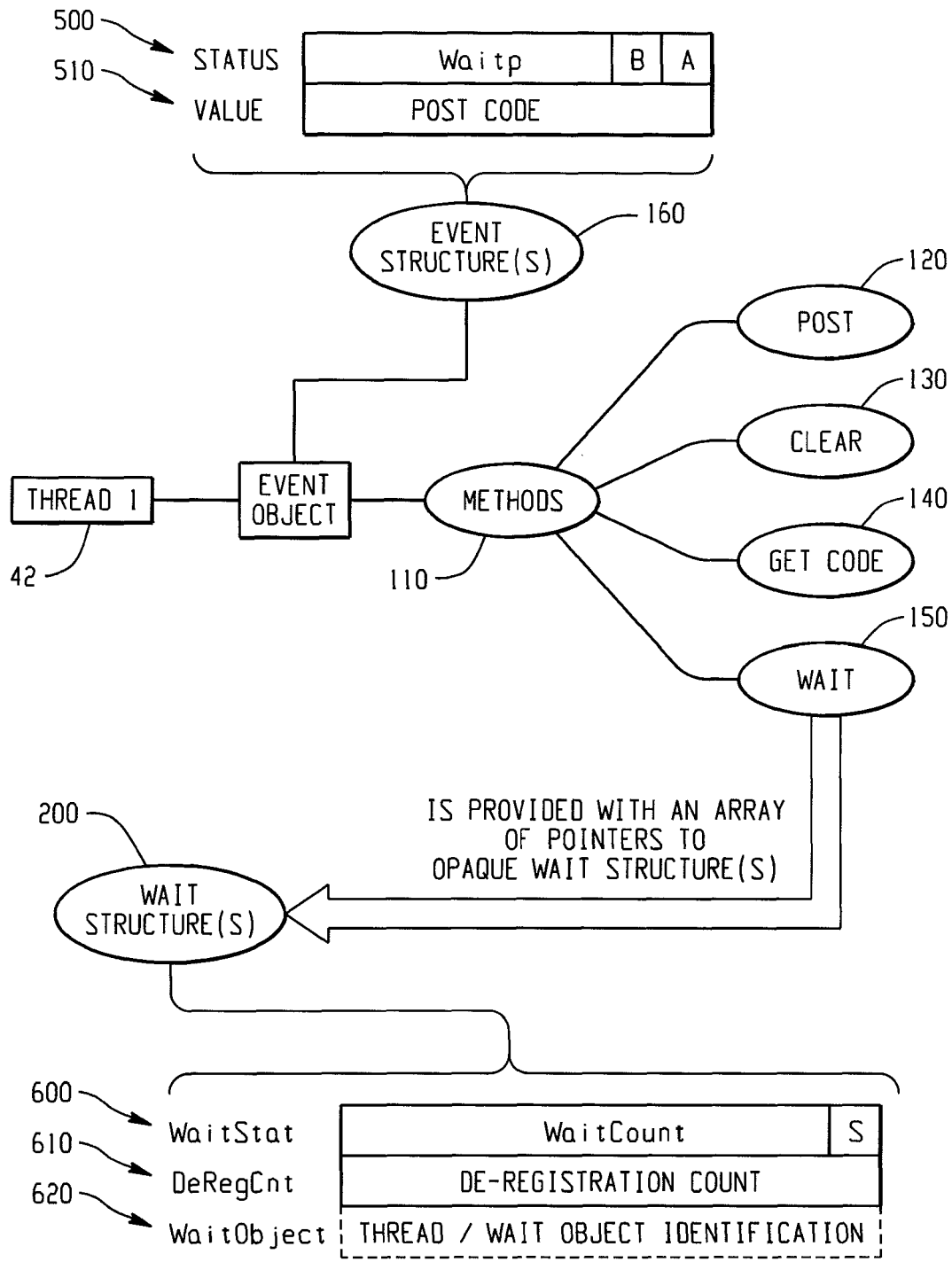

FIGS. 7 and 8 provide an example of event and wait structures that were discussed above. FIG. 7 depicts an example definition of event structure(s) 160. Generally, event objects have a user level structure of two atomic integer values. Atomic integers can be used to guarantee visibility of updates between threads without locking.

More specifically within the event structure(s) 160, Event.Status 500 determines the current state of the event. It is broken into two separate 'fields' within the atomic integer value: A pointer to a wait structure (which is 4-byte aligned in this example) and one or more status bits. The status bits are used to determine the current posted state of an event; bitA determines the Posted Status, bitB protects against a multiple poster race condition.

When an event is in the posted state, the Event.Value value 510 of the event structure(s) 160 reflects the user given value of the event. This value can be queried by an Event GetValue( ) method.

FIG. 8 depicts an example definition of wait structure(s) 200, which are used to process Wait( ) requests. The wait structure(s) 200 pointed to by Waitp of Event.Status 500 in the event structure(s) 160 can be implemented in multiple ways, such as in the following ways: an atomic structure within Wait( ); embedded within each thread context structure; as a WaitCount field within the Thread Context, etc. In essence, each wait structure has a count field and a separate wait object (which may be implied within a thread context).

More specifically within the wait structure(s) 200, Wait.WaitStat 600 determines the current state of the wait object. It is broken into two separate 'fields' within the atomic integer value: a count before the WaitObject should be signaled and a status bit S which determines if the WaitObject has already been signaled.

Wait.DeRegCnt 610 is used for processing the de-registration of the Waitp after the wait operation conditions have been met. This can be accomplished in different ways, such as by differentiating the current mode with an additional status bit in Wait.WaitStat 600 to determine the current operational mode.

Also within the wait structure(s) 200, Wait.WaitObject 620 is the underlying wait object that the thread calling Wait( ) uses to wait until it has been signaled.

As a further illustration of these structures, FIGS. 9-13 provide another operational scenario in the form of state diagrams for handling unlimited events during a wait( ) method without use of operating system locks. The operational scenario illustrates an example implementation which allows threads to wait on multiple events whose count may be larger than the operating system provided wait API (example: Windows® limits the event count to 64). The event handling system can also be configured to wait on any number events instead of a One-or-All model. The implementation depicted in the state diagrams accomplishes this with a minimal of resources (e.g., minimizes operating system interaction). For example, the implementation reduces the number of required operating system calls/overhead, such as eliminating the need for both an operating system lock and operating system event for each event structure. As another example, the implementation also eliminates the need for an operating system post/clear event for each Post( ) and Clear( ) operation to each event as well as provides for a thread to wait for an unlimited (within hardware/operating system limits) number of wait events. Additionally, the operational scenario illustrates that no operating system lock is required for individual event object processing or wait object processing. This is also accomplished without using a SPIN-LOCK semantics (which diminishes thread scaling performance).

Figure 9B:
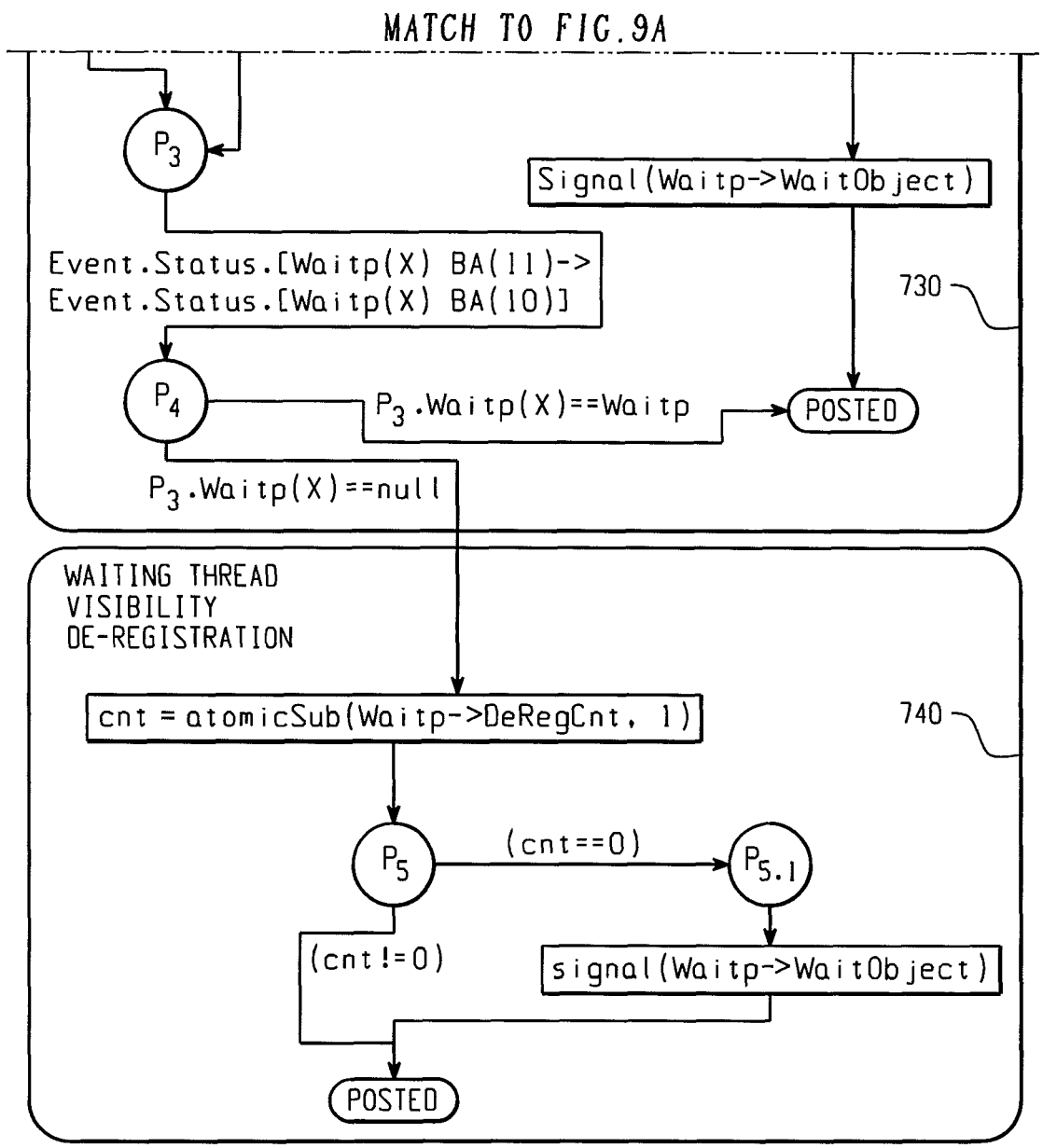
FIGS. 9A-13 are state diagrams depicting the handling of unlimited events during a wait method without use of operating system locks.

FIGS. 9A-9B depict at 700 an operational scenario with respect to posting an event and includes a registration phase 720, a phase 730 which involves waiting thread processing, and a waiting thread visibility de-registration phase 740. In this operational scenario, the post method is structured as shown at 710: Post (Event, Value). Posting an event allows for setting the internal value and ensuring that a thread waiting on the event will be awakened if its wait condition has been met. Within the registration phase 720, State P0 resolves the race condition with any other Post or Clear request. Progression to state P1 is only accomplished if the status bits can be successfully changed from cleared (00) to a processing state value (01).

State P1 sets the events value to the value expressed in the Post call. State P1 resolves the race condition between a Wait request and a Post request. If the event status for the wait pointer remains null while the status is changed from processing (01) to a posted state (10) then the Post request has been completed. If a pointer to a wait structure has been successfully registered in the event status, then processing proceeds to state P2.

Within the waiting thread processing phase 730, State P2 decrements the wait structure's status counter. If this decrement operation reduced the count portion of the wait status to zero then the thread's wait condition has been met; processing proceeds at state P2.1. If this decrement operation is non-zero then the wait condition has not been met and processing proceeds to state P3.

State P2.1 resolves the race condition between other post requests and the wait request. If the S bit of the wait structure WaitStat field is successfully changed from clear (0) to signaled (1), then the process proceeds to state P2.2 to signal the waiting thread; otherwise the bit will be in the signaled (1) state and processing continues at state P3.

State P2.2 sets the signal flag to true for future post (after status has been updated to POST).

State P3 resolves the race condition between post processing and wait deregistration. This is accomplished by capturing the value of the wait pointer in the event status while the status bits are changed from wait (11) to posted (10).

State P4 ensures that the waiting thread is signaled if necessary.

Within the de-registration phase 740, State P5 determines the next processing requirement. If the transition to a posted state P3 results in a valid Wait Pointer, then the post operation is complete. If the Wait Pointer is null, visibility processing continues at state P6.

State P6 completes the resolution of the race condition between post processing and wait deregistration processing. This is done by decrementing the wait structure pointer DeRegCnt field. If the result of this field is non-zero, the event processing is complete. If it is zero, wait processing requires another post, and then processing proceeds to state P6.1. State P6.1 posts the wait event, signaling the thread that all event processing threads with visibility have completed their operations.

Figure 10A:
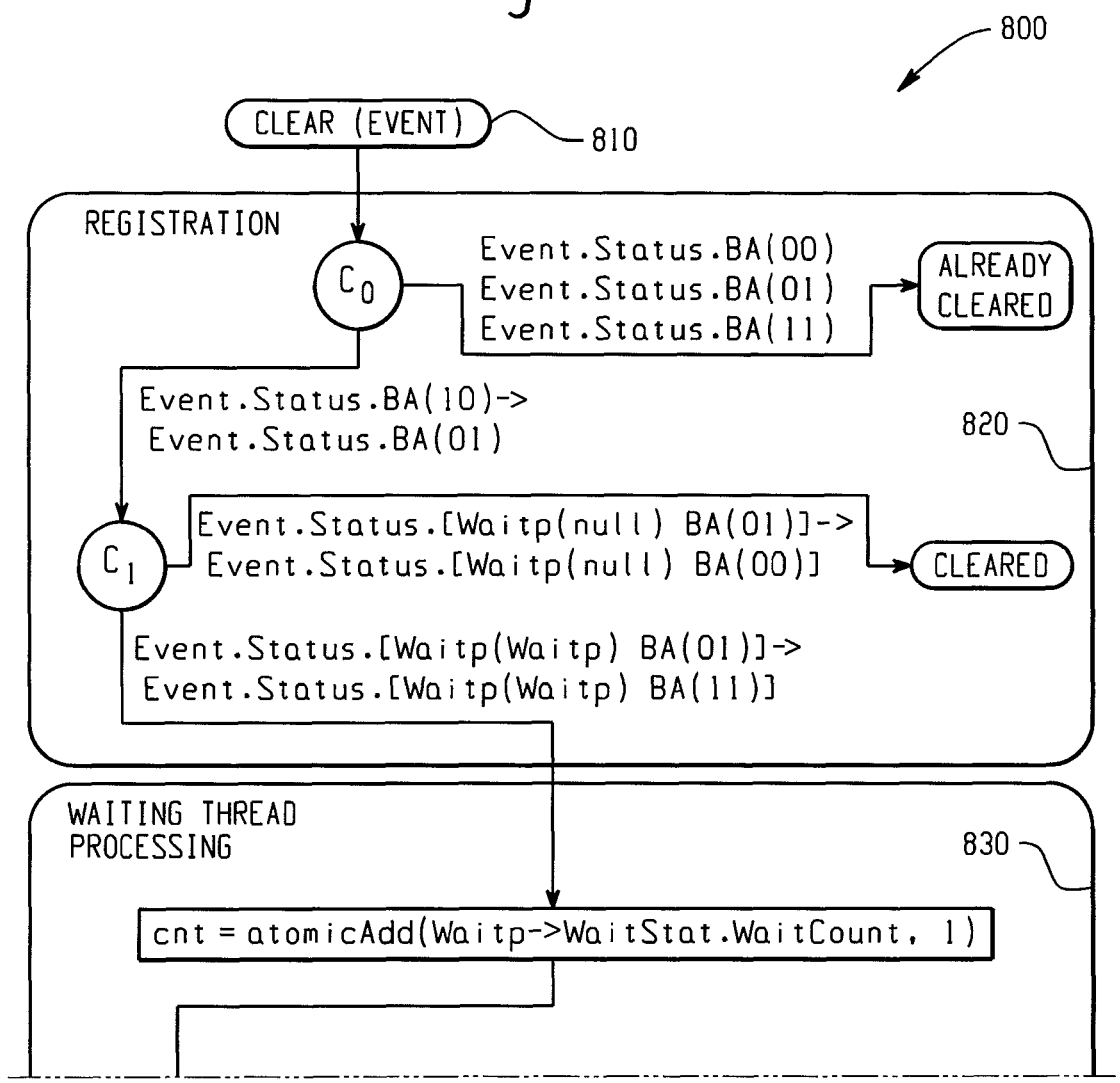
Figure 10B:
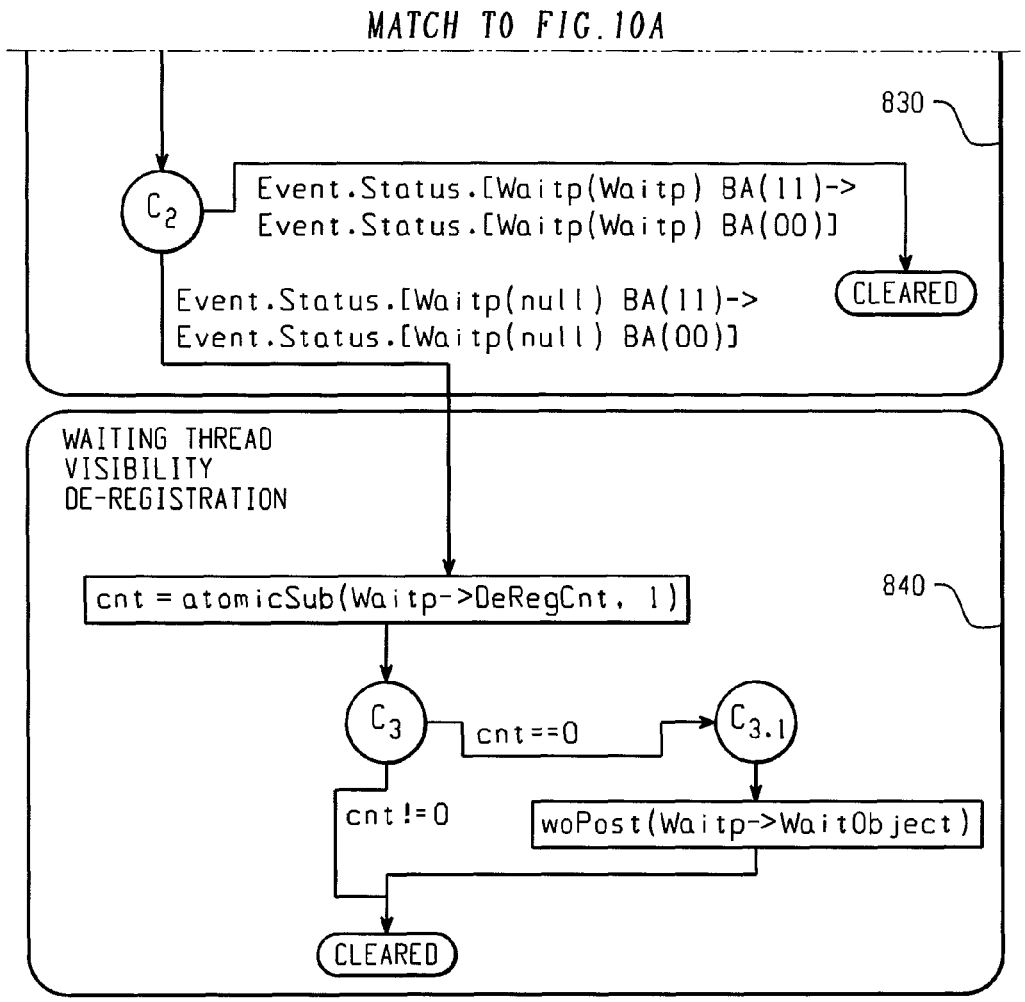

FIGS. 10A-10B depict at 800 an operational scenario with respect to clearing an event and includes a registration phase 820, a phase 830 which involves waiting thread processing, and a waiting thread visibility de-registration phase 840. In this operational scenario, the clear method is structured as shown at 810: Clear(Event). Clearing an event is the act of setting the state of the event to be cleared (or unposted). It also updates any wait processing state to include one less posted event (if necessary).

Within the registration phase 820, State C0 resolves the race condition with any other Post or Clear request. Progression to state C1 is only accomplished if the status bits can be successfully changed from posted (10) to a processing state value (01).

State C1 resolves the race condition between a Wait request and a Clear request. If the event status for the wait pointer remains null while the status is changed from processing (01) to a cleared state (00) then the Clear request has been completed. If a pointer to a wait structure has been successfully registered in the event status, the process proceeds to state C2.

Within the waiting thread processing phase 830, State C2 increments the wait structures status counter. It also resolves the race condition between this clear request and a wait request. If the event status for the wait pointer remains non-null while the status bits can be changed from wait thread processing (11) to cleared (00) then the clear operation is complete. Otherwise the wait pointer will be null and processing continues at state C3.

Within the de-registration phase 840, State C3 completes the resolution of the race condition between clear processing and wait deregistration processing. This is done by decrementing the wait structure pointer DeRegCnt field. If the result of this field is non-zero, the event processing is complete. If it is zero, wait processing requires another post and processing proceeds to state C3.1 wherein the wait event is posted.

Figure 11:
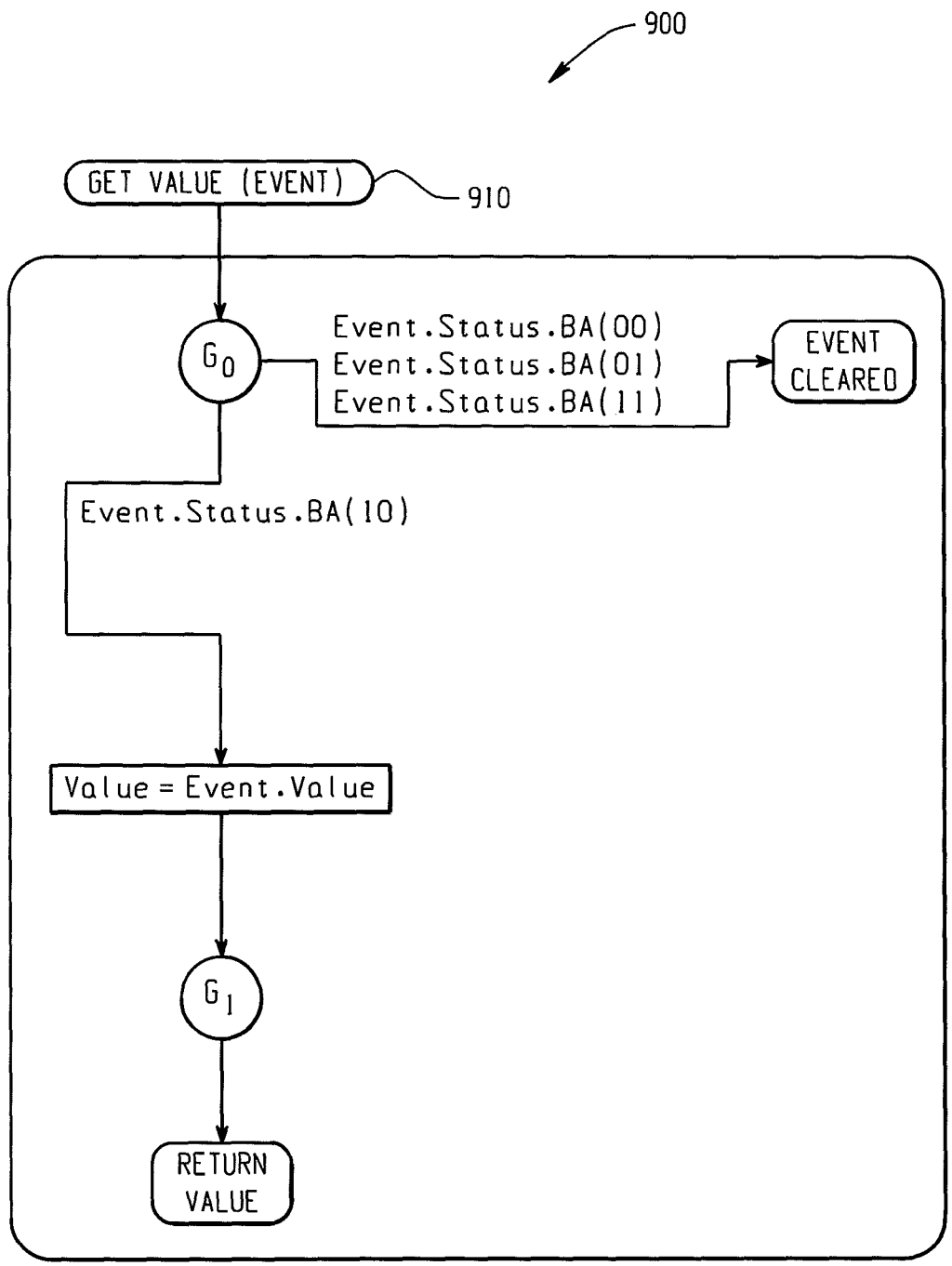

FIG. 11 depicts at 900 an operational scenario with respect to obtaining an event internal value. In this operational scenario, the Get Value method is structured as shown at 910: GetValue(Event). Getting an event value ensures it is in a posted state and returning the value.

Within the operational scenario 900, State G0 validates the current state of the event. Progression to state G1 is only accomplished if the status bits are equal to the posted state value (10). Any other value for these status bits returns an 'event cleared' value.

State G1 returns the current value of the event. Race condition protection can be added in this operational scenario via the status bits. However, it is noted that the race condition resolves itself from the perspective that the posted value is considered to be the value of the last posted state.

Figure 12:
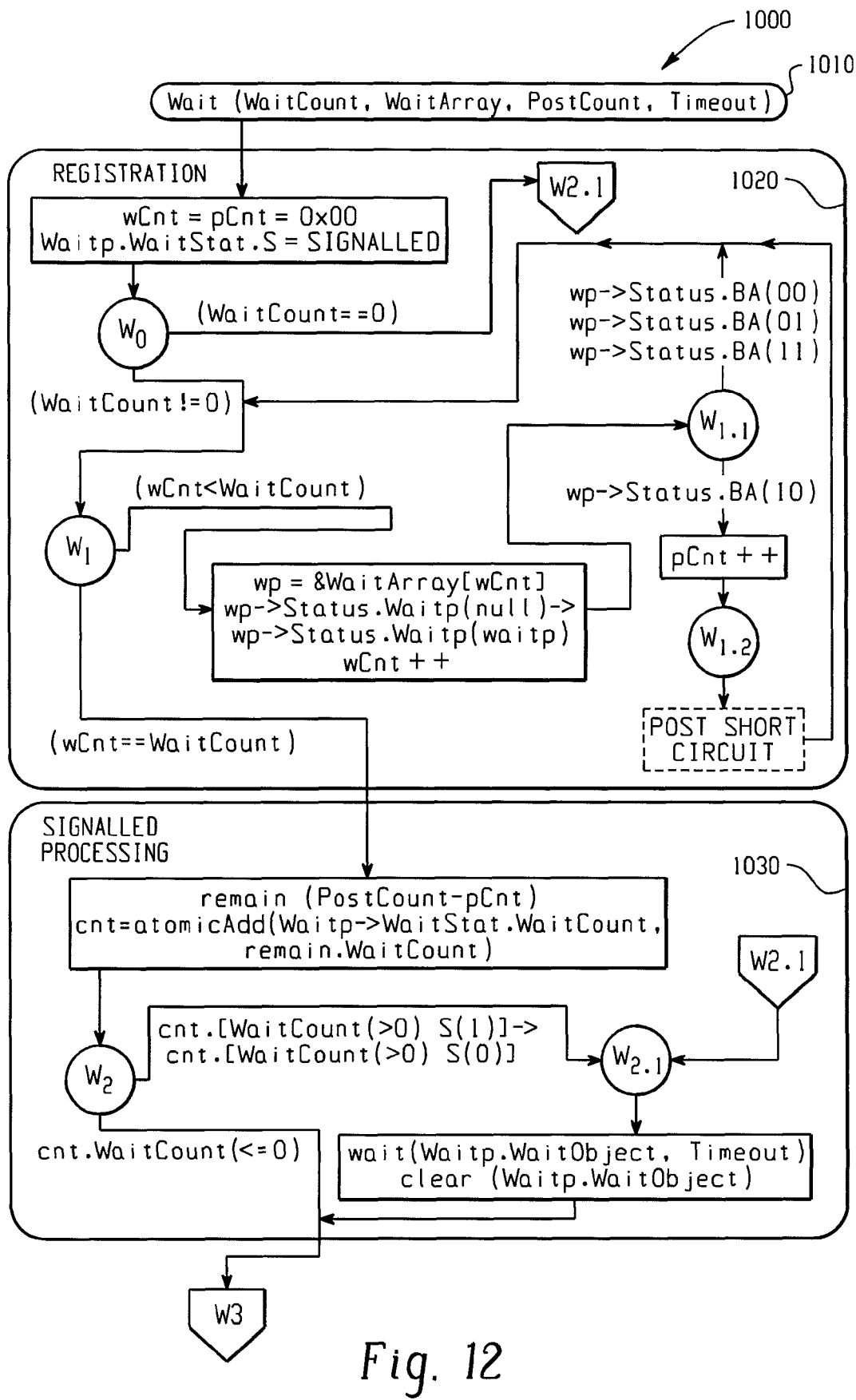
Figure 13:
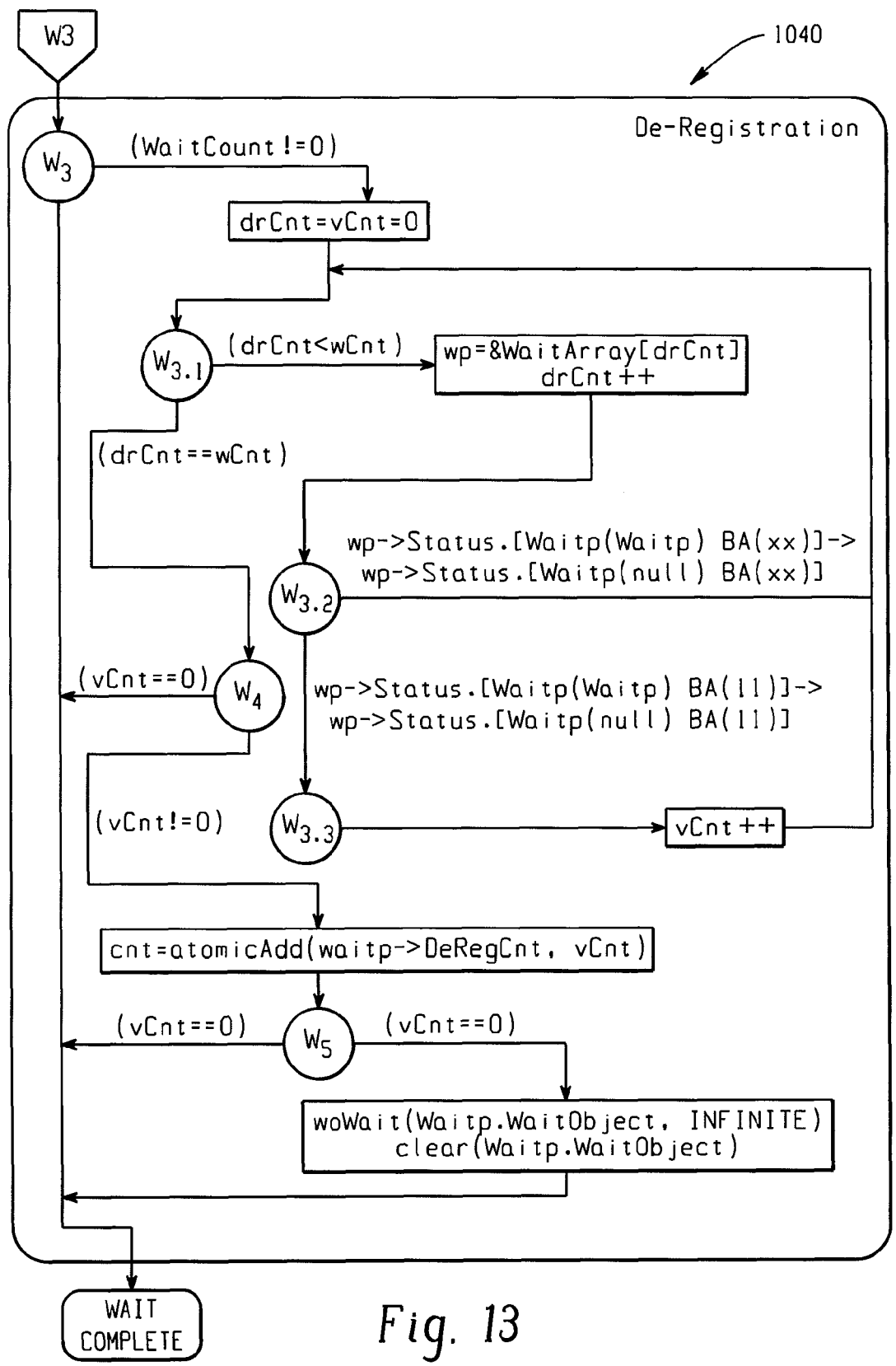

FIGS. 12 and 13 provide an operational scenario with respect to waiting on event(s) and includes a registration phase 1020, a signaled processing phase 1030, and an event deregistration phase 1040. In this operational scenario, the wait method is structured as shown at 1010: Wait(WaitCount, WaitArray, PostCount, Timeout). Threads use the wait process to wait on any number of events to be in a posted state. This provides the capability to wait on any number of events from one to WaitCount.

Within the registration phase 1020, State W0 sets up the internal Wait structure status and initializes internal variables. If the parameter WaitCount is zero (i.e., a thread does not want to wait on any events), then the wait processing proceeds directly to state W2.1.

State W1 begins the process of setting the event status wait ptr to point back to the address of this thread's wait structure. The status is set and progress continues at state W1.1. This process continues for each of the events until all the events specified in WaitArray have been thus registered.

State W1.1 keeps track of how many events are already in the posted state. If the state is truly posted (10), then processing proceeds to state W1.2. Any other event state processing will return to state W1 for the next pass.

State W1.2 increments the current posted count (pCnt). At this point there is a chance to short circuit the event registration process (though it is not required). The conditions of the wait operation are considered met when the number of posted events is equal to PostCount. This can be done with a check at state W1.2 (pCnt==PostCount). It is noted that this check may not be completely accurate, as events could have been cleared during wait processing. A complete solution can use the equation: ((pCnt−Waitp−>WaitStat.WaitCount)>=PostCount). In either case, a short circuit method can be used for early termination of the event registration phase.

Within the signaled processing phase 1030, State W2 determines if the current wait condition has been met. Note that precedence has been given to the thread that is not waiting in that State W0 initializes the wait status as already signaled. State W2 reverses this assumption if a wait is necessary. The number of posted events (pCnt) is subtracted from PostCnt. This remaining value is then added to the wait status count field. If this field is less than or equal to zero, then processing proceeds to state W3. If it is greater than zero and the wait count status bit can be successfully cleared, then processing proceeds to state W2.1.

State W2.1 waits on the operating system wait object, clearing it after the wait has been completed. Processing continues at state W3.

State W3 begins the event deregistration phase 1040. If there are no events to deregister, the wait has completed. If there are events, then internal variables are initialized and processing continues at state W3.1.

State W3.1 is the reverse of the registration processing loop begun at state W1. For each event that was registered, the Waitp needs to be removed from the event status waitp field. If there are more events to deregister, then processing proceeds to state W3.2. If the count of deregistered events equals the count of registered events, then processing proceeds to state W4.

State W3.2 initializes internal variables and then processes deregistration of the waitp for the current event. This resolves the race condition between Post, Clear, and Wait. If the waitp field is nulled while the status bits are active (11), then processing proceeds to state W3.3. If the waitp field can be nulled with any other status (00, 01, 10), then processing proceeds for the next event at state W3.1.

State W3.3 tracks the number of visibility race conditions. The visibility counter (vCnt) is incremented and processing proceeds to the next loop at state W3.1.

State W4 determines if visibility processing is required (race conditions were encountered at state W3.2). If vCnt is zero, then wait processing is complete. If vCnt is non-zero continue to state W5.

State W5 finalizes the deregistration race condition processing. It adds the number of visibility events (vCnt) to the Waitp DeRegCnt field. If this is zero, all visibility events are accounted for and wait processing is complete. If this is non-zero, a final wait is performed on the OS wait object. After this wait completes, the wait operation is complete.

It should be understood that similar to the other processing flows described herein, the processing flow of this operational scenario may be altered, modified, removed and/or augmented and still achieve the desired outcome.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   initializing a group of multiple threads in a computer system, wherein the group of multiple threads execute in a multi-thread environment;

synchronizing the group of multiple threads by restricting one thread of the group from executing until multiple event conditions are satisfied, wherein each of the multiple event conditions corresponds to a different one of the multiple events;

initializing multiple event objects, wherein each of the multiple event objects stores information about a different one of the multiple events and a corresponding event condition, and wherein each of the multiple event objects is associated with multiple methods including a wait method for updating and accessing the event condition information stored by the object;

registering the multiple event objects, wherein registering an event object includes using the wait method to perform a wait operation to determine a status of an event by referencing an event condition information corresponding to the event stored by the event object and generating and storing a pointer associated with the event object;

initializing a wait data structure, wherein the wait data structure holds a counter, wherein the counter is configured to indicate when all of the multiple event conditions are satisfied, and wherein initializing includes linking a pointer to the wait data structure;

associating the one restricted thread of the group with the wait data structure;

updating the counter when an event condition is satisfied;

determining that all of the multiple event conditions are satisfied when the counter value reaches zero; and in response to determining that all of the multiple event conditions are satisfied, ceasing to restrict the one thread of the group from executing.

2. The method of claim 1, wherein storing a pointer provides visibility of an event condition corresponding to an event, and wherein the visibility is provided to an event object corresponding to the event.

3. The method of claim 1, wherein synchronizing the group of multiple threads is done without an operating system lock.

4. The method of claim 1, wherein each of the multiple event objects further includes a method for clearing event information at the event object.

5. The system of claim 1, wherein each of the multiple event objects further includes a post method.

6. The method of claim 1, wherein the events are asynchronous events.

7. A system, comprising:

one or more data processors; and one or more non transitory computer-readable storage media containing instructions configured to cause the one or more processors to perform operations including:

initializing a group of multiple threads in a computer system, wherein the group of multiple threads execute in a multi-thread environment;

synchronizing the group of multiple threads by restricting one thread of the group from executing until multiple event conditions are satisfied, wherein each of the multiple event conditions corresponds to a different one of the multiple events;

initializing multiple event objects, wherein each of the multiple event objects stores information about a different one of the multiple events and a corresponding event condition, and wherein each of the multiple event objects is associated with multiple methods including a wait method for updating and accessing the event condition information stored by the object;

registering the multiple event objects, wherein registering an event object includes using the wait method to perform a wait operation to determine a status of an event by referencing an event condition information corresponding to the event stored by the event object and generating and storing a pointer associated with the event object;

initializing a wait data structure, wherein the wait data structure holds a counter, wherein the counter is configured to indicate when all of the multiple event conditions are satisfied, and wherein initializing includes linking a pointer to the wait data structure;

associating the one restricted thread of the group with the wait data structure;

updating the counter when an event condition is satisfied;

determining that all of the multiple event conditions are satisfied when the counter value reaches zero; and in response to determining that all of the multiple event conditions are satisfied, ceasing to restrict the one thread of the group from executing.

8. The system of claim 7, wherein storing a pointer provides visibility of an event condition corresponding to an event, and wherein the visibility is provided to an event object corresponding to the event.

9. The system of claim 7, wherein synchronizing the group of multiple threads is done without an operating system lock.

10. The system of claim 7, wherein each of the multiple event objects further includes a method for clearing event information at the event object.

11. The system of claim 7, wherein each of the multiple event objects further includes a post method.

12. The system of claim 7, wherein the events are asynchronous events.

13. A computer-program product tangibly embodied in a non-transitory machine readable storage medium, and including instructions configured to cause a data processing apparatus to perform operations including:

initializing a group of multiple threads in a computer system, wherein the group of multiple threads execute in a multi-thread environment;

synchronizing the group of multiple threads by restricting one thread of the group from executing until multiple event conditions are satisfied, wherein each of the multiple event conditions corresponds to a different one of the multiple events;

initializing multiple event objects, wherein each of the multiple event objects stores information about a different one of the multiple events and a corresponding event condition, and wherein each of the multiple event objects is associated with multiple methods including a wait method for updating and accessing the event condition information stored by the object;

registering the multiple event objects, wherein registering an event object includes using the wait method to perform a wait operation to determine a status of an event by referencing an event condition information corresponding to the event stored by the event object and generating and storing a pointer associated with the event object;

initializing a wait data structure, wherein the wait data structure holds a counter, wherein the counter is configured to indicate when all of the multiple event conditions are satisfied, and wherein initializing includes linking a pointer to the wait data structure;

associating the one restricted thread of the group with the wait data structure;

updating the counter when an event condition is satisfied;

determining that all of the multiple event conditions are satisfied when the counter value reaches zero; and in response to determining that all of the multiple event conditions are satisfied, ceasing to restrict the one thread of the group from executing.

14. The computer-program product of claim 13, wherein storing a pointer provides visibility of an event condition corresponding to an event, and wherein the visibility is provided to an event object corresponding to the event.

15. The computer-program product of claim 13, wherein synchronizing the group of multiple threads is done without an operating system lock.

16. The computer-program product of claim 13, wherein each of the multiple event objects further includes a method for clearing event information at the event object.

17. The computer-program product of claim 13, wherein each of the multiple event objects further includes a post method.

18. The computer-program product of claim 13, wherein the events are asynchronous events.

* * * * *